United States Patent
Gotani

(10) Patent No.: US 11,897,348 B2
(45) Date of Patent: Feb. 13, 2024

(54) POWER TRANSMISSION DEVICE, WIRELESS POWER TRANSMISSION SYSTEM, AND INFORMATION COMMUNICATION SYSTEM

(71) Applicant: TDK CORPORATION, Tokyo (JP)

(72) Inventor: Akira Gotani, Tokyo (JP)

(73) Assignee: TDK CORPORATION, Tokyo (JP)

( * ) Notice: Subject to any disclaimer, the term of this patent is extended or adjusted under 35 U.S.C. 154(b) by 400 days.

(21) Appl. No.: 17/365,257

(22) Filed: Jul. 1, 2021

(65) Prior Publication Data
US 2022/0032792 A1    Feb. 3, 2022

(30) Foreign Application Priority Data

Jul. 29, 2020   (JP) .................................. 2020-128465

(51) Int. Cl.
*B60L 53/124*   (2019.01)
*B60L 53/38*    (2019.01)
(Continued)

(52) U.S. Cl.
CPC ............. *B60L 53/124* (2019.02); *B60L 53/38* (2019.02); *H02J 50/60* (2016.02); *H02J 50/90* (2016.02);
(Continued)

(58) Field of Classification Search
CPC .. B60L 53/124; B60L 53/38; H02J 13/00022; H02J 50/005; H02J 50/60; H02J 50/90;
(Continued)

(56) References Cited

U.S. PATENT DOCUMENTS 10,173,540 B2 *   1/2019   Taniguchi ............... B60L 53/65
10,523,258 B2 *  12/2019   Hong ..................... A61N 1/0551
(Continued)

FOREIGN PATENT DOCUMENTS

CN      108528340 A  *   9/2018   ............... B60Q 1/50
DE   102015216480 A1  *   3/2017   ............. B60L 11/182
(Continued)

OTHER PUBLICATIONS

Kumura et al., Japanese Patent Document No. JP-2016048974-A, published Apr. 7, 2016, 3 page, including abstract and 1 drawing. (Year: 2016).*

*Primary Examiner* — Phallaka Kik
(74) *Attorney, Agent, or Firm* — Oliff PLC

(57) ABSTRACT

A power transmission device that wirelessly transmits power to a vehicle, the power transmission device including an information emitter that, in a case in which the position of the vehicle acquired by the information acquirer is located in a power transmission range of the power transmission coil and, also, the instruction receiver receives the instruction about power transmission, emits a first type of information that indicates a presence of the foreign object when the detector detects the foreign object, and in a case in which the instruction receiver does not receive the instruction about power transmission even though the position of the vehicle acquired by the position information acquirer is located in the power transmission range of the power transmission coil, does not emit the information that indicates the presence of the foreign object.

10 Claims, 7 Drawing Sheets

(51) Int. Cl.
  *H02J 50/60*   (2016.01)
  *H02J 50/90*   (2016.01)
  *H02J 13/00*   (2006.01)
  *H02J 50/40*   (2016.01)
(52) U.S. Cl.
  CPC ....... *H02J 13/00022* (2020.01); *H02J 50/402* (2020.01)
(58) Field of Classification Search
  CPC ............. H02J 50/402; H01M 2220/30; H01M 2220/20
  USPC ................. 320/109, 108, 104, 114
  See application file for complete search history.

(56) References Cited

U.S. PATENT DOCUMENTS

| | | | | |
|---|---|---|---|---|
| 2015/0236515 A1* | 8/2015 | Yoshida | | H02J 50/402 307/104 |
| 2015/0349542 A1* | 12/2015 | Yamamoto | | G01V 3/10 307/104 |
| 2016/0149442 A1* | 5/2016 | Asanuma | | H02J 7/00302 307/104 |
| 2016/0202355 A1* | 7/2016 | Liu | | G01S 13/931 342/70 |
| 2017/0057371 A1* | 3/2017 | Nordbruch | | B60L 53/66 |
| 2017/0093212 A1 | 3/2017 | Nagamine | | |
| 2018/0166929 A1* | 6/2018 | Sawai | | G01V 3/10 |
| 2018/0264961 A1* | 9/2018 | Nakagawa | | H02J 50/10 |
| 2019/0260241 A1* | 8/2019 | Park | | H04L 5/0055 |
| 2019/0273402 A1* | 9/2019 | Niizuma | | H02J 50/12 |
| 2019/0275904 A1* | 9/2019 | Matsuo | | B60L 50/50 |
| 2020/0389061 A1* | 12/2020 | Lee | | H02J 50/80 |
| 2021/0358283 A1* | 11/2021 | Li | | B60R 22/48 |
| 2022/0276333 A1* | 9/2022 | Sakai | | G01S 5/011 |

FOREIGN PATENT DOCUMENTS

| | | | | |
|---|---|---|---|---|
| JP | 2014057472 A * | 3/2014 | | |
| JP | 2017-070020 A | 4/2017 | | |
| JP | 2017093140 A * | 5/2017 | | |
| JP | 6464219 B2 * | 2/2019 | | B60L 11/1825 |
| JP | 2020108262 A * | 7/2020 | | |
| WO | WO-2014041729 A1 * | 3/2014 | | H02J 17/00 |
| WO | WO-2014103795 A1 * | 7/2014 | | B60L 11/1803 |
| WO | WO-2015087693 A1 * | 6/2015 | | B60L 11/182 |
| WO | WO-2019078306 A1 * | 4/2019 | | B60L 53/12 |

\* cited by examiner

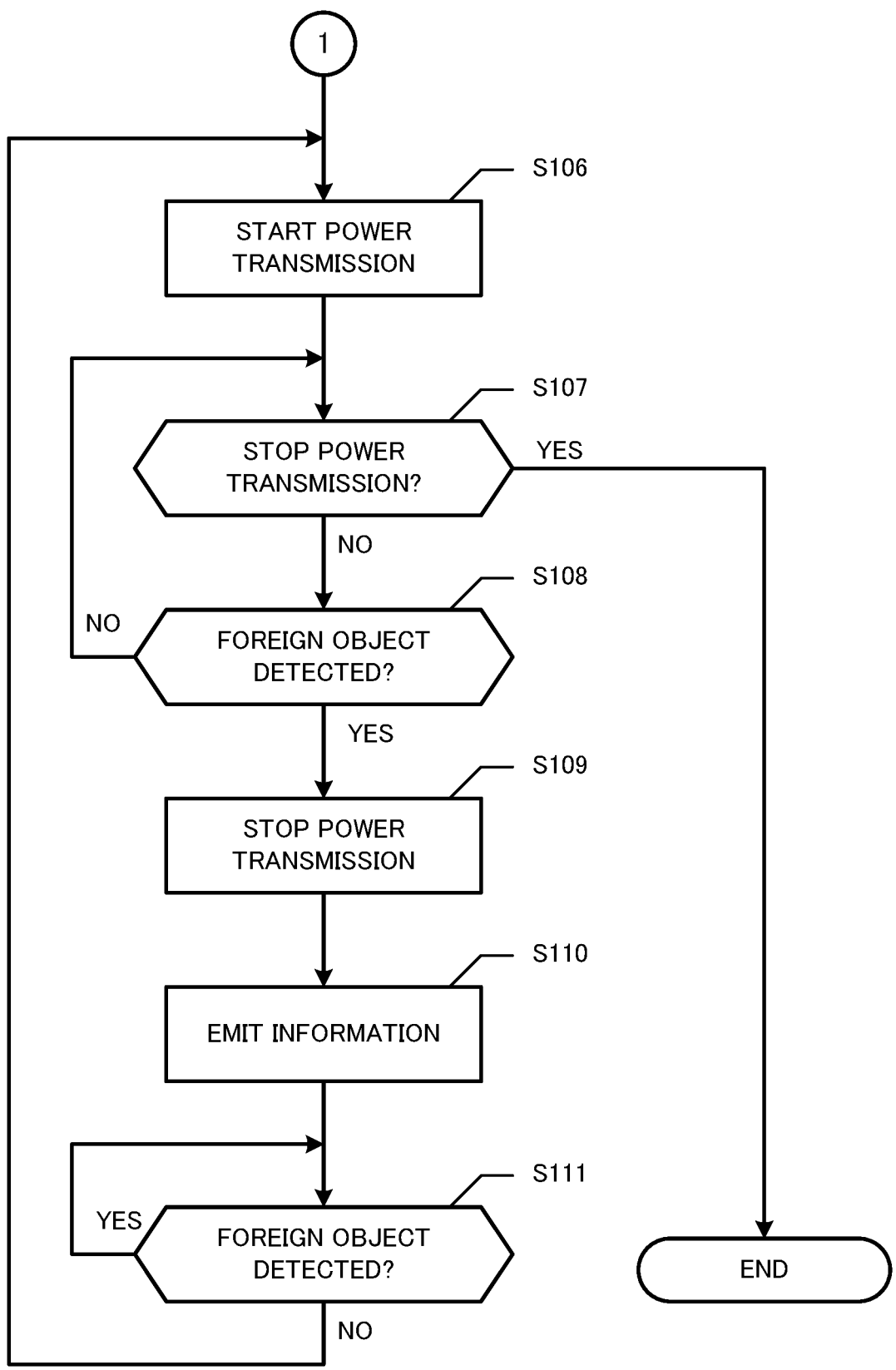

POWER TRANSMISSION DEVICE, WIRELESS POWER TRANSMISSION SYSTEM, AND INFORMATION COMMUNICATION SYSTEM

CROSS-REFERENCE TO RELATED APPLICATION

This application claims the benefit of Japanese Patent Application No. 2020-128465, filed on Jul. 29, 2020, the entire disclosure of which is incorporated by reference herein.

FIELD

The present disclosure relates generally to a power transmission device, a wireless power transmission system, and an information communication system.

BACKGROUND

There have been advancements in the development of wireless power transmission systems in which a power transmission device wirelessly transmits electric power to a power receiving device. In general, electromagnetic induction is used to transmit power between the power transmission device and the power receiving device.

When power is being transmitted between the power transmission device and the power receiving device, if a conductive object different than the power receiving device is disposed near the devices, eddy current will be generated in that object due to electromagnetic induction, and that object may generate heat. As such, when a foreign object is disposed near the power transmission device and the power receiving device, it is preferable to notify the user with information indicating the presence of the foreign object and prompt the user to remove the foreign object.

However, when a foreign object is disposed near the power transmission device and the power receiving device, if the user is constantly notified with information indicating the presence of the foreign object, the user may feel annoyed. Therefore, it is preferable that the information indicating the presence of the foreign object is notified to the user under appropriate conditions.

Patent Literature 1 discloses a technique for notifying a user with information indicating the presence of a foreign object when both a mobile terminal provided with a power receiving function (power receiving device) and an object different than the mobile terminal are disposed near the power transmission device. According to Patent Literature 1, notifying the user under such a condition prevents unnecessary notifications, and can reduce annoyance.

SUMMARY

When the notification method disclosed in Patent Literature 1 is applied to a vehicle provided with a power receiving function, unnecessary notifications may be performed.

The present disclosure is made with the view of the above situation and a main objective of the present disclosure is to reduce the annoyance caused by unnecessary notifications in a power transmission device that wirelessly transmits power to a vehicle provided with a power receiving function.

To achieve the objective described above, a power transmission device according to one embodiment of the present disclosure is a power transmission device that wirelessly transmits power to a vehicle provided with a power receiving function, the power transmission device comprising: a power transmitter that includes a power transmission coil and that transmits power to the vehicle via the power transmission coil; a detector that includes a function for detecting a foreign object present in a detection target region; a position information acquirer that acquires a position of the vehicle; an instruction receiver that receives an instruction about power transmission to the vehicle; and an information emitter that, in a case in which the position of the vehicle acquired by the information acquirer is located in a power transmission range of the power transmission coil and, also, the instruction receiver receives the instruction about power transmission, emits a first type of information that indicates a presence of the foreign object when the detector detects the foreign object, and in a case in which the instruction receiver does not receive the instruction about power transmission even though the position of the vehicle acquired by the position information acquirer is located in the power transmission range of the power transmission coil, does not emit the information that indicates the presence of the foreign object.

According to the power transmission device provided with the configuration described above, annoyance caused by unnecessary notifications can be reduced.

BRIEF DESCRIPTION OF THE DRAWINGS

A more complete understanding of this application can be obtained when the following detailed description is considered in conjunction with the following drawings, in which:

FIG. 7 is a flowchart illustrating power supply processing.

DETAILED DESCRIPTION

Hereinafter, a power transmission device according to some embodiments is described while referencing the drawings. In addition, a power transmission system including the power transmission device and a power receiving device, and an information communication system including the power transmission device and a communication device are described. Note that, in the embodiments, an example is described in which the power receiving device is implemented as a vehicle such as, for example, an electric passenger vehicle, and the communication device is implemented as a mobile terminal such as, for example, a smartphone.

Configuration of System

Figure 1:
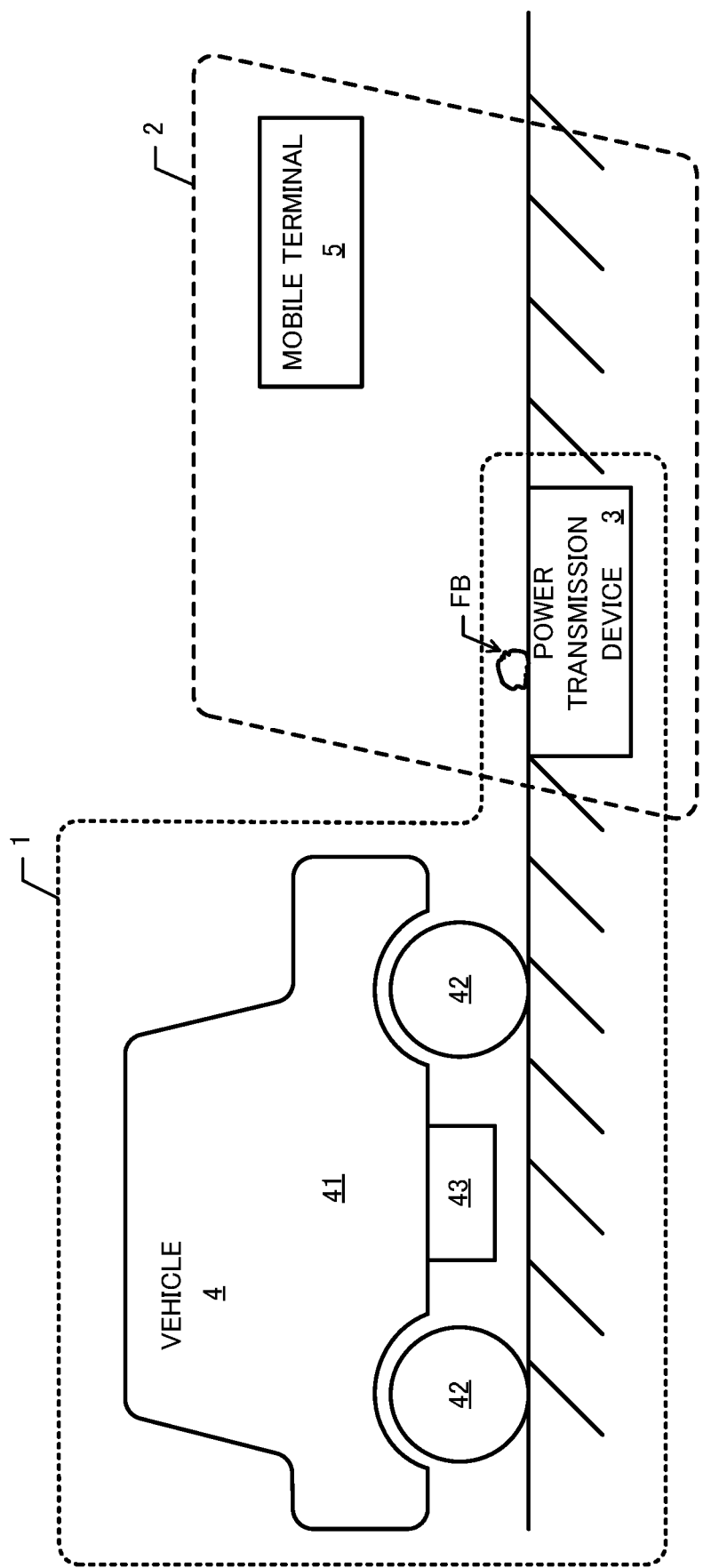
FIG. 1 is a schematic drawing schematically illustrating a power transmission system and an information communication system.

FIG. 1 illustrates a power transmission system 1 and an information communication system 2 according to some embodiments. The power transmission system 1 includes a power transmission device 3 and a vehicle 4 provided with a power receiving function. The information communication system 2 includes the power transmission device 3 and a mobile terminal 5 provided with a communication function.

The power transmission device 3 uses electromagnetic induction to wirelessly transmit power to the vehicle 4. The vehicle 4 includes a vehicle body 41, wheels 42 that support the vehicle body 41, and a power receiver 43 that is provided on a bottom of the vehicle body 41 and that receives electric power transmitted from the power transmission device 3.

When a foreign object FB is present near the power transmission device 3, the power transmission device 3 sends, under appropriate conditions, information (foreign object information) indicating the presence of the foreign object FB. The mobile terminal 5 receives the foreign object information sent from the power transmission device 3.

Note that, herein, the term "foreign object FB" refers mainly to a conductive member in which eddy current can be generated due to electromagnetic induction. The term "foreign object FB" includes humans, animals, and other living organisms.

Hereinafter, the detailed configurations of the power transmission device 3, the vehicle 4, and the mobile terminal 5 are described in order.

Configuration of Power Transmission Device

Figure 2:
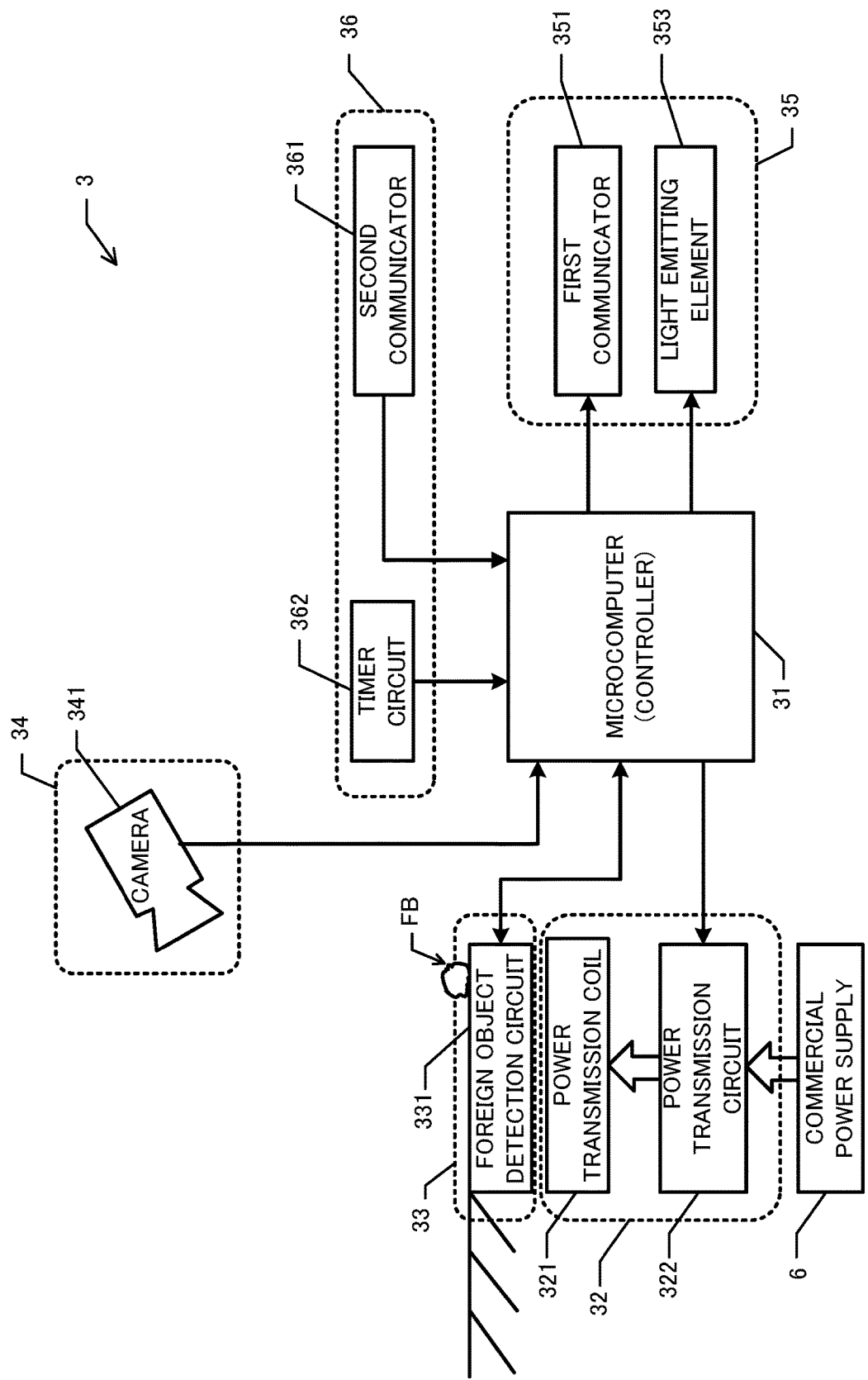
FIG. 2 is a block diagram illustrating the configuration of a power transmission device.

FIG. 2 illustrates the hardware configuration and the functional configuration of the power transmission device 3. The power transmission device 3 mainly includes a microcomputer 31 that carries out various types of computation processing and the overall control of all operations of the power transmission device 3, a power transmitter 32 that transmits power to the vehicle 4 via a power transmission coil 321, a detector 33 that detects the foreign object FB present in a detection target region, a position information acquirer 34 that acquires a position of the vehicle 4, an information emitter 35 that emits the foreign object information under appropriate conditions when the detector 33 detects the foreign object FB, and an instruction receiver 36 that receives an instruction for starting or stopping power transmission to the vehicle 4.

The microcomputer (controller) 31 mainly includes a processor that carries out computations related to various functions, control of various hardware units, and the like; and a memory that stores programs that are executed by the processor, numerical data to be set in the various hardware units, and the like. The processor executes power supply processing (described later) in accordance with a program stored in the memory.

The power transmitter 32 mainly includes the power transmission coil 321, and a power transmission circuit 322 that supplies electric power (sends current) to the power transmission coil 321. The power transmission coil 321 is implemented as a lead wire that is wound around an imaginary axis perpendicular to the ground. The power transmission coil 321 may be housed in a housing, and the outer edge of this housing may be configured as the outer edge of the power transmission coil 321. The power transmission coil 321 is set on the ground or, alternatively, is embedded into the ground, for example.

The power transmission circuit 322 includes a power factor improvement circuit that rectifies and raises AC voltage supplied from a commercial power supply 6 and converts that AC voltage to a predetermined DC voltage, an inverter circuit that converts the DC voltage converted by the power factor improvement circuit to AC voltage, and the like. The power transmission circuit 322 supplies electric power to the power transmission coil 321 on the basis of a control signal from the microcomputer 31.

The detector 33 mainly includes a sensor, for example, a foreign object detection circuit 331, that detects the foreign object FB that is present in the detection target region. Note that the detector 33 may include an infrared sensor that detects living organisms. Here, the detection target region of the sensor, of the detector 33, that detects conductive members is set to within the power transmission range of the power transmission coil 321, and the detection target region of the sensor, of the detector 33, that detects living organisms is set to a lower portion of the vehicle 4 and a surrounding area of the vehicle 4.

The foreign object detection circuit 331 is, fundamentally, a resonant circuit including a coil and a capacitor, and is disposed overlapping the power transmission coil 321. The resonant circuit of the foreign object detection circuit 331 is excited, on the basis of the control signal from the microcomputer 31, by the application of voltage from a non-illustrated power supply, and an output value output from the resonant circuit of the foreign object detection circuit 331 is input into the microcomputer 31. The microcomputer 31 compares the output value with a reference value, which is an output value of the resonant circuit of the foreign object detection circuit 331 acquired when a foreign object is not present in the detection target region, and determines whether the foreign object FB is present near the foreign object detection circuit 331. Note that the detector 33 may include a signal analysis device that compares and analyzes the output value and the reference value.

The foreign object detection circuit 331 may be housed in the housing of the power transmission coil 321 together with the power transmission coil 321. Additionally, the foreign object detection circuit 331 may be housed in a separate housing than the housing of the power transmission coil 321, and may be disposed overlapping the housing of the power transmission coil 321.

In one example, the position information acquirer 34 includes a camera (imaging device) 341 that images the vehicle 4. The microcomputer 31 analyzes a captured image obtained by the camera 341 to calculate the position, speed, and the like of the vehicle 4. Note that the position information acquirer 34 may include an image analysis device that analyzes the captured image to calculate the position, speed, and the like of the vehicle 4.

The information emitter 35 mainly includes a first communicator 351 that performs wireless communication with the vehicle 4 and that performs communication with the mobile terminal 5 via a network (internet), and a light emitting element 353 that emits light information. Note that the information emitter 35 may further include a speaker that emits sound information (emits an alert sound).

The first communicator 351 includes a wireless communication controller, an antenna, and the like. The wireless communication controller of the first communicator 351 includes a high frequency circuit, a baseband circuit, and the like, and sends and receives wireless signals. In particular, the wireless communication controller of the first communicator 351 includes a modulation circuit, encodes or modulates signals sent from the microcomputer 31, and sends the encoded or modulated signals to the vehicle 4 via the antenna.

Furthermore, in one example, the first communicator 351 connects to a server on the internet, and sends a message (text information) to the mobile terminal 5 via that server. In one example, the light emitting element 353 lights in a blue color at normal times, and in a red color at abnormal times.

The instruction receiver 36 mainly includes a second communicator 361 that performs wireless communication with the vehicle 4, and a timer circuit 362 that measures the time. In one example, the timer circuit 362 includes a crystal oscillator, a frequency dividing circuit, and the like.

The second communicator 361 includes a wireless communication controller, an antenna, and the like. The wireless communication controller of the second communicator 361 includes a high frequency circuit, a baseband circuit, and the like, and sends and receives wireless signals. In particular, the wireless communication controller of the second communicator 361 includes a demodulation circuit, demodulates or decodes wireless signals received via the antenna, and sends the demodulated or decoded wireless signals to the microcomputer 31. Note that the first communicator 351 and the second communicator 361 may be constituted by a single communicator (communication controller).

Configuration of Vehicle

Figure 3:
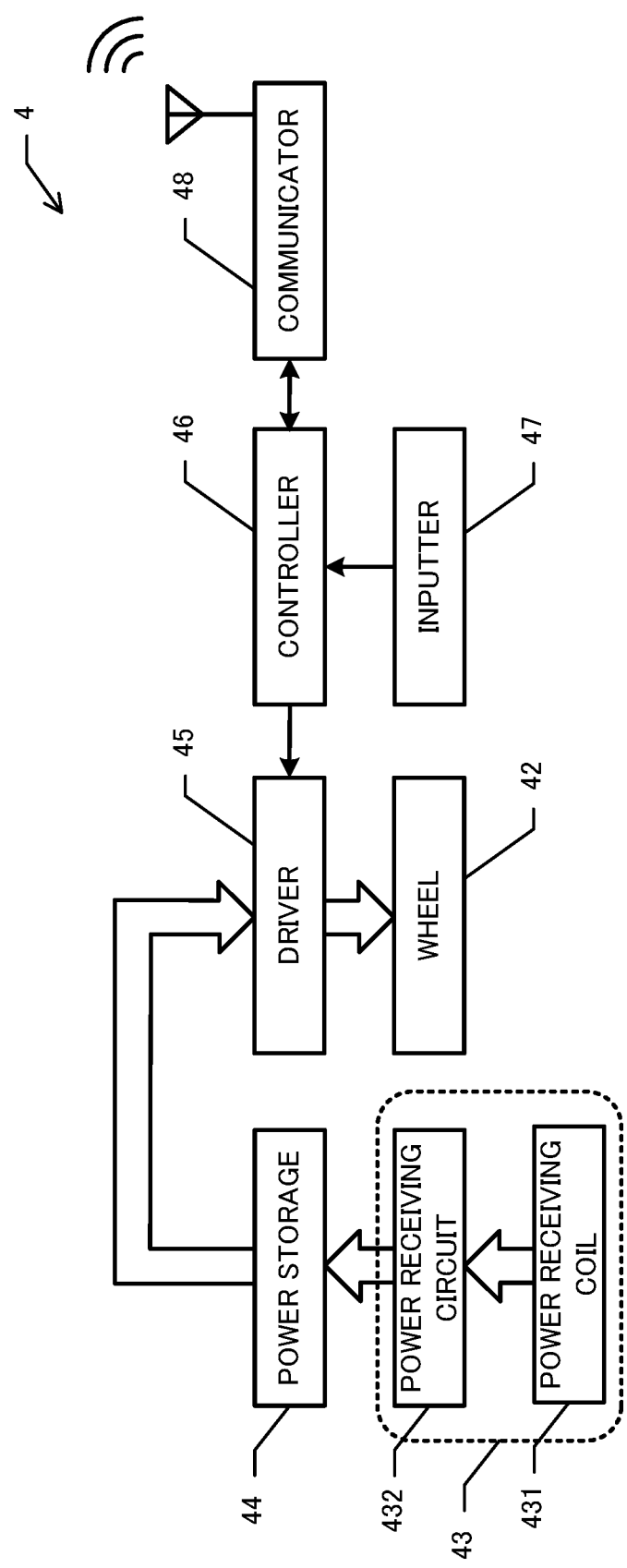
FIG. 3 is a block diagram illustrating the configuration of a vehicle.

FIG. 3 illustrates the functional configuration of the vehicle 4. In one example, the vehicle 4 is an electric passenger vehicle, and includes, in addition to the vehicle body 41, the wheels 42, and the power receiver 43, a power storage 44 that stores electric power supplied from the power receiver 43, a driver 45 that rotates the wheels 42 on the basis of the electric power stored in the power storage 44, a controller 46 that controls the driver 45, an inputter 47 including an accelerator pedal, a brake pedal, and the like, and a communicator 48 that performs wireless communication with the power transmission device 3.

The power receiver 43 mainly includes the power receiving coil 431, and a power receiving circuit 432 that converts inputted AC voltage to DC voltage and outputs the DC voltage. The power receiving coil 431 is implemented as a lead wire that is wound around an imaginary axis perpendicular to the ground. The power receiving circuit 432 includes a typical rectifying/smoothing circuit.

In one example, the power storage 44 includes a lithium ion battery, a lead-acid battery, or the like. The driver 45 includes a motor that generates motive force from the electric power (converts electrical energy to kinetic energy). The communicator 48 includes a wireless signal controller that sends and receives wireless signals, an antenna, and the like.

In one example, the controller 46 includes a processor and a memory. The controller 46 mainly controls the driver 45 (the rotation speed of the motor) on the basis of information from the power transmission device 3 received by the communicator 48 and information obtained from the inputter 47 (depressed amount of the accelerator pedal and the brake pedal).

Configuration of Mobile Terminal

Figure 4:
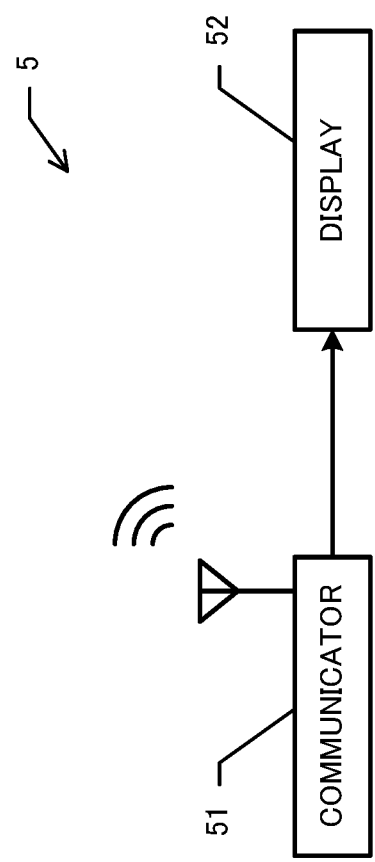
FIG. 4 is a block diagram illustrating the configuration of a mobile terminal.

FIG. 4 illustrates the functional configuration of the mobile terminal 5. In one example, the mobile terminal 5 is implemented as a smartphone that is provided with a mobile phone function. The mobile terminal 5 mainly includes a communicator 51 that receives a message from the server on the internet via a mobile phone base station, and a display 52 that displays the message.

The communicator 51 includes a wireless communication controller, an antenna, and the like. In one example, the display 52 includes a liquid crystal element or an electro-luminescence (EL) element.

Operations of System

Hereinafter, the operations of the power transmission system 1 and the information communication system 2 are described while referencing FIGS. 5 to 7.

Figure 5:
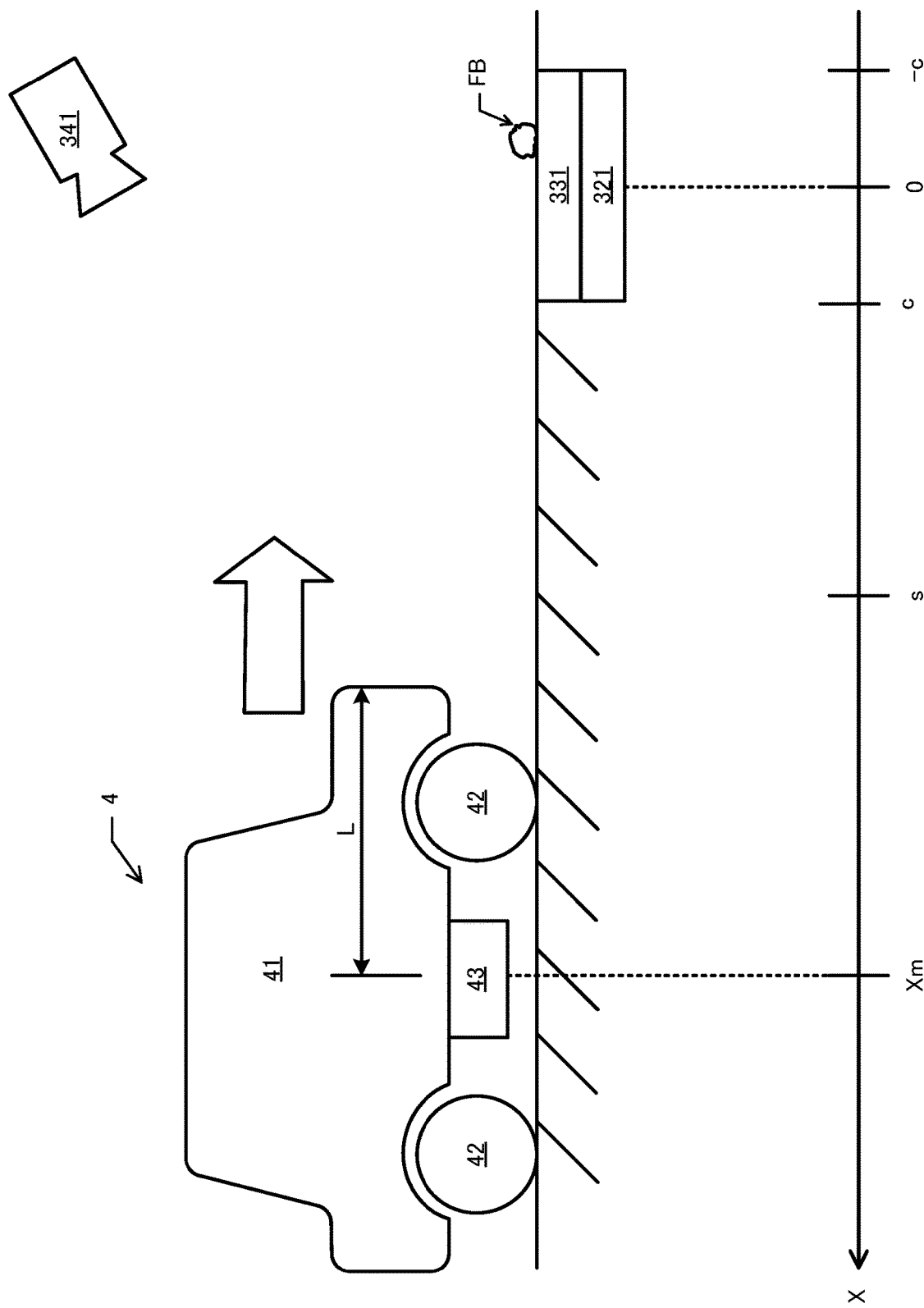
FIG. 5 is a schematic drawing illustrating the relative positional relationship between a power transmission coil and the vehicle.

FIG. 5 illustrates the relative positional relationship between the power transmission coil 321 of the power transmission device 3 and the vehicle 4. To facilitate comprehension, an X axis is set that extends in one direction along the ground. Additionally, the origin of the X axis is set to a center position (position of the winding axis of the lead wire) of the power transmission coil 321. In this case, a situation is envisioned in which the vehicle 4 gradually approaches the power transmission coil 321 (Xm=0) from afar (Xm=∞) to be supplied with power.

Note that, the position Xm of the vehicle 4 matches the center position of the power receiver 43, in particular the center position (position of the winding axis of the lead wire) of the power receiving coil 431, attached to the bottom of the vehicle body 41. A length from the center position of the power receiving coil 431 to a leading end of the vehicle body 41 is L.

One end of the power transmission coil 321 is disposed at a position c and the other end is disposed at a position −c. In this case, the power transmission range of the power transmission coil 321 is from the position −c to the position c on the X axis. Here, the power transmission range of the power transmission coil 321 is the range in which power can be efficiently transmitted to the power receiving coil 431 and, in one example, is a range up to a height of 1 m directly above the power transmission coil 321. In the example illustrated in FIG. 5, the foreign object detection range of the foreign object detection circuit 331 disposed overlapping the power transmission coil 321 is adjusted to about the same range as the power transmission range of the power transmission coil 321.

A reference position s is set at a desired position on the X axis. In one example, a position separated from the power transmission coil 321 (the origin of the X axis) by a braking distance of the vehicle 4 is set as the reference position s. Note that, a position of the vehicle 4 when a portion of the vehicle 4, for example, the leading edge of the vehicle body 41, covers the power transmission coil 321 (that is, the position c+L on the X axis), for example, can be set as the reference position s. Additionally, a position separated from the power transmission coil 321 (the origin of the X axis) by 3 m, 5 m, 10 m, or the like, for example, may be set as the reference position s. The reference position s can be appropriately set to a position separated from the power transmission coil 321 (the origin of the X axis) by a certain distance.

Figure 6:
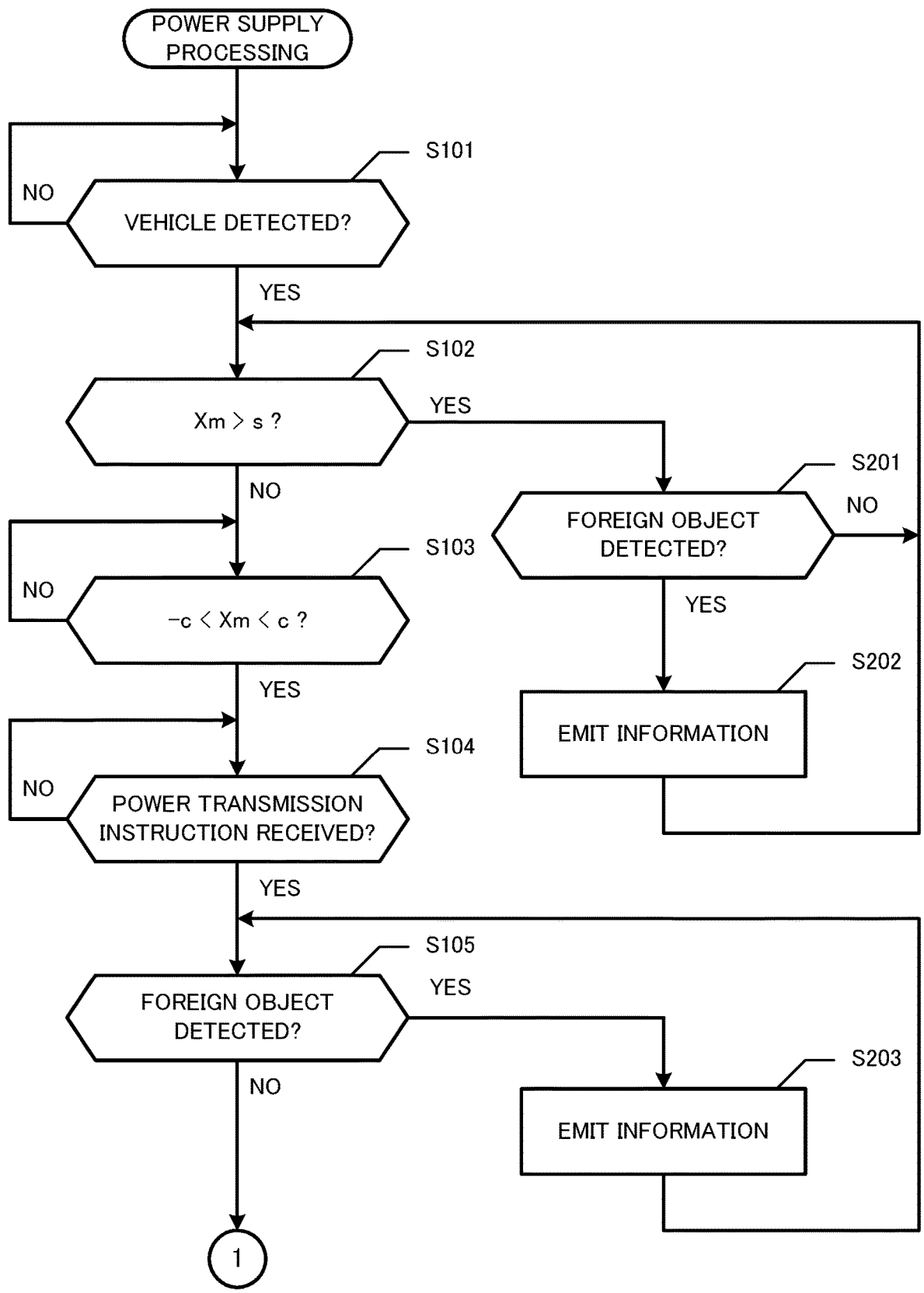
FIG. 6 is a flowchart illustrating power supply processing.

FIGS. 6 and 7 are flowcharts illustrating power supply processing executed by the microcomputer 31 of the power transmission device 3. The program in which the power supply processing is written is stored in the memory of the microcomputer 31, and is executed by the processor when electric power is supplied to the microcomputer 31, for example.

FIG. 6 is referenced in the following description. In step S101, the microcomputer 31 monitors whether the vehicle 4 is present near the power transmission coil 321. If the microcomputer 31 determines that the vehicle 4 is not detected (step S101; No), the microcomputer 31 executes step S101. That is, the microcomputer 31 continues detection for the vehicle 4 until the vehicle 4 is detected.

If the microcomputer 31 determines that the vehicle 4 is detected (step S101; Yes), the microcomputer 31 executes step S102. For example, the microcomputer 31 determines that the vehicle 4 is detected when the vehicle 4 is imaged by the camera 341 or when a communication connection is established between the first communicator 351 (the wireless communication controller) of the second communicator 361 (the wireless communication controller) of the power transmission device 3 and the communicator 48 (the wireless communication controller) of the vehicle 4. Then, the microcomputer 31 starts a foreign object detection operation by the foreign object detection circuit 331.

In step S102, the microcomputer 31 determines, on the basis of the image of the vehicle 4 captured by the camera 341, whether the position Xm of the vehicle 4 is closer to the power transmission coil 321 (the origin of the X axis) than the reference position s. If the microcomputer 31 determines that the position Xm of the vehicle 4 is farther from the power transmission coil 321 than the reference position s, that is, determines that the vehicle 4 has not reached the reference position s (step S102; Yes), the microcomputer 31 executes step S201. If the microcomputer 31 determines that the position Xm of the vehicle 4 is closer to the power transmission coil 321 than the reference position s, that is, determines that the vehicle 4 has reached the reference position s (step S102; No), the microcomputer 31 executes step S103 and continues to monitor the position Xm of the vehicle 4.

In step S201, the microcomputer 31 analyzes the output value output by the foreign object detection circuit 331 and the reference value to determine whether the foreign object FB is present in the power transmission region of the power transmission coil 321 that is the detection target region. If the microcomputer 31 determines that the foreign object FB is present in the power transmission range of the power transmission coil 321 that is the detection target region (step S201; Yes), the microcomputer 31 executes step S202 and sends information (foreign object information) indicating the presence of the foreign object FB. If the microcomputer 31 determines that the foreign object FB is not present in the power transmission range of the power transmission coil 321 that is the detection target region (step S201; No), the microcomputer 31 executes step S102 and continues to monitor the position Xm of the vehicle 4.

In step S202, the microcomputer 31 causes the light emitting element 353 of the information emitter 35 to light (emit light information). As a result, the operator of the vehicle 4 recognizes that the foreign object FB is disposed in the power transmission range of the power transmission coil 321 that is the detection target region, and attempts to stop the vehicle 4.

Note that, in step S202, the microcomputer 31 may send the foreign object information to the vehicle 4 via the first communicator 351. In the vehicle 4, when the controller 46 receives the foreign object information via the communicator 48, the controller 46 controls the driver 45 to automatically stop the vehicle 4.

Thus, when the foreign object FB is in the power transmission range of the power transmission coil 321 that is the detection target region, the foreign object information is emitted before the vehicle 4 reaches the reference position s. As a result, the vehicle 4 can be stopped before the vehicle 4 covers the power transmission coil 321 or the foreign object FB. This makes it possible for a user to easily remove the foreign object FB. When the vehicle 4 is to stop on the basis of the foreign object information in this manner, it is preferable that a position at which the vehicle 4 can stop prior to the power transmission coil 321 is set as the reference position s.

Next, step S103 is described. In step S103, the microcomputer 31 determines whether the position Xm of the vehicle 4 measured by the camera 341 is in the power transmission range of the power transmission coil 321. If the microcomputer 31 determines that the vehicle 4 has not entered the power transmission range of the power transmission coil 321 (step S103; No), the microcomputer 31 executes step S103 and continues to monitor the position Xm of the vehicle 4. If the microcomputer 31 determines that the vehicle 4 has entered the power transmission range of the power transmission coil 321 (step S103; Yes), the microcomputer 31 executes step S104.

Note that, in step S103, the microcomputer 31 does not emit the foreign object information even if the foreign object FB is present in the power transmission range of the power transmission coil 321 that is the detection target region. This is because it is thought that, if the vehicle 4 is stopped on the basis of the foreign object information, it will be difficult to remove the foreign object FB due to the vehicle 4 being excessively close to the foreign object FB or covering the foreign object FB.

Thus, in step S103, the foreign object detection function of the detector 33 may be disabled. For example, the microcomputer 31 may stop the supply of voltage that is applied to the foreign object detection circuit 331. As a result, power consumption required for foreign object detection can be suppressed for the period in which the foreign object information is not emitted.

Note that, in step S103, a determination condition for determining whether the vehicle 4 is stopped may be added. Specifically, step S104 may be executed when the vehicle 4 has entered the power transmission range of the power transmission coil 321 and also is stopped. In one example, the stopping of the vehicle 4 can be determined by analyzing an image captured by the camera 341.

In step S104, the microcomputer 31 determines whether the instruction receiver 36 receives an instruction to start power transmission. If the microcomputer 31 determines that the instruction to start power transmission is not received (step S104; No), the microcomputer 31 executes step S104. If the microcomputer 31 determines that the instruction to start power transmission is received (step S104; Yes), the microcomputer 31 executes step S105.

In one example, the microcomputer 31 determines that the instruction to start power transmission is received when a signal requesting starting of power transmission is received from the vehicle 4 via the second communicator 361. Additionally, the microcomputer 31 determines that the instruction to start power transmission is received in a case in which the microcomputer 31 references the time measured by the timer circuit 362 and a time (for example, 00:00 AM) set by the user has arrived. Alternatively, the microcomputer 31 determines that the instruction to start power transmission is received when the microcomputer 31 references the time measured by the timer circuit 362 and an amount of time set by the user (for example, 10 minutes after the vehicle 4 enters the power transmission range of the power transmission coil 321) has passed. The instruction to start power transmission can be appropriately set.

Note that, in step S104, if the microcomputer 31 determines that the instruction to start power transmission is not received, the microcomputer 31 does not emit the foreign object information even if the foreign object FB is present in the power transmission range of the power transmission coil 321 that is the detection target region. Due to this, the foreign object detection function of the detector 33 may be disabled during that period.

Thus, the microcomputer 31 does not emit the foreign object information unless the power transmission instruction is received, even if the vehicle 4 is positioned in the power transmission range of the power transmission coil 321. As such, unnecessary and non-urgent notifications can be suppressed and annoyance can be reduced.

In step S105, the microcomputer 31 determines whether the foreign object FB is present in the power transmission range of the power transmission coil 321 that is the detection target region. If the microcomputer 31 determines that the foreign object FB is present in the power transmission range of the power transmission coil 321 that is the detection target region (step S105; Yes), the microcomputer 31 executes step S203 and emits the foreign object information. If the microcomputer 31 determines that the foreign object FB is not present (step S105; No), the microcomputer 31 executes step S106 and starts power transmission to the vehicle 4.

Note that, in step S203, there is a high possibility that the operator is not on-board the vehicle 4. As such, the microcomputer 31 sends a message expressing the foreign object information to the mobile terminal 5 via the first communicator 351. The user of the vehicle 4 confirms the foreign object information displayed on the display 52 of the mobile terminal 5 and, as a result, even if separated from the vehicle 4, the user can recognize that the foreign object FB is present in the power transmission range of the power transmission coil 321 that is the detection target region, and that power transmission will not be started.

FIG. 7 is referenced in the following description. In step S106, the microcomputer 31 sends a control signal to the power transmission circuit 322. The power transmission circuit 322 supplies electric power (sends current) to the power transmission coil 321 on the basis of this control signal. At this time, the electric power is wirelessly transmitted, by electromagnetic induction, from the power transmission coil 321 to the vehicle 4 positioned in the power transmission range. Specifically, an alternating magnetic field is generated due to AC current flowing through the power transmission coil 321, and electromotive force (voltage) is induced in the power receiving coil 431 by that magnetic field.

In step S107, the microcomputer 31 determines whether to stop the power transmission. If the microcomputer 31 determines to stop the power transmission, (step S107; Yes), the microcomputer 31 ends the power supply processing. If the microcomputer 31 determines not to stop the power transmission (step S107; No), the microcomputer 31 executes step S108.

For example, in a case in which the microcomputer 31 receives, from the vehicle 4 via the second communicator 361, a notification that the power storage 44 is fully charged, the microcomputer 31 determines to stop the power transmission. Additionally, the microcomputer 31 determines to stop the power transmission in a case in which the microcomputer 31 references the time measured by the timer circuit 362 and a time (for example, 05:00 AM) set by the user has arrived. Alternatively, the microcomputer 31 determines to stop the power transmission in a case in which an amount of time set by the user (for example, 3 hours after the start of power transmission) has passed. The condition for stopping the power transmission can be appropriately set.

In step S108, the microcomputer 31 determines whether the foreign object FB is present in the power transmission range of the power transmission coil 321 that is the detection target region. If the microcomputer 31 determines that the foreign object FB is not present in the power transmission range of the power transmission coil 321 that is the detection target region (step S108; No), the microcomputer 31 executes step S107. Additionally, if the microcomputer 31 determines that the foreign object FB is present (step S108; Yes), the microcomputer 31 executes step S109 to stop the power transmission, and then executes step S110 to send the foreign object information.

In step S110, there is a high possibility that the driver is not on-board the vehicle 4. As such, the microcomputer 31 sends a message expressing the foreign object information to the mobile terminal 5 via the first communicator 351.

In step S111, the microcomputer 31 determines whether the foreign object FB is removed from the power transmission range of the power transmission coil 321 that is the detection target region. If the microcomputer 31 determines that the foreign object FB is not removed (step S111; Yes), the microcomputer 31 executes step S111. If the microcomputer 31 determines that the foreign object FB is removed (step S111; No), the microcomputer 31 executes step S106 and restarts the power transmission. Note that, from the perspective of safety, it is preferable that the power transmission is restarted after a certain amount of time has passed (for example, after three minutes have passed) after the foreign object FB is removed.

The process described above is the flow of the power supply processing executed by the microcomputer 31.

Note that, the foreign object information emitted in steps S203 and S110 is referred to as a first type of foreign object information. In steps S203 and S110, there is a high possibility that the user is not on-board the vehicle 4. As such, the microcomputer 31 sends, as the first type of foreign object information, a message (text information) to the mobile terminal 5 via the first communicator 351. Note that, in this case, the information emitter 35 may emit light information, radio wave information, or the like.

The foreign object information emitted in step S202 is referred to as a second type of foreign object information. In step S202, there is a high possibility that the driver is on-board the vehicle 4. As such, the microcomputer 31 emits, as the second type of foreign object information, information (light information) perceivable by humans to the user and prompts stopping of the vehicle 4. Additionally, the microcomputer 31 emits, as the second type of foreign object information, electronic information (radio wave information) to the vehicle 4 and automatically stops the vehicle 4. Note that, in this case as well, the information emitter 35 may emit the text information.

MODIFIED EXAMPLES

In the embodiment described above, a case is envisioned in which the power receiving device is the vehicle 4, specifically, an electric passenger vehicle. However, the power receiving device is not limited to a passenger vehicle, and can be applied to large special vehicles, motorcycles, electric assisted bicycles, and other electric vehicles. Note that the power receiver 43 including the power receiving coil 431 and the power receiving circuit 432 may be regarded as the power receiving device. Additionally, a case is envisioned in which the communication device is the mobile terminal 5, specifically a smartphone. However, the communication device can be applied to a notebook computer, a tablet terminal, a wearable terminal, or the like that includes a communication function.

In the embodiment described above, an example is described in which the microcomputer 31 of the power transmission device 3 performs, in a software-like manner, computations for various functions, control of the various hardware units, and the like. However, a configuration is possible in which these computations and control are performed, in a hardware-like manner, by a dedicated logic circuit. Additionally, the microcomputer 31 can, for example, be replaced with a computer that includes, as separate elements/components, a central processing unit (CPU), a random access memory (RAM), a read-only memory (ROM), and the like.

The detector 33 is not limited to the foreign object detection circuit 331 and, for example, a configuration is possible in which the detector 33 includes a temperature sensor that detects heat generation, temperature rises, and the like caused by eddy current occurring in the foreign object FB. Likewise, the position information acquirer 34 is not limited to the camera 341 and, for example, a configuration is possible in which the position information acquirer 34 includes a device that emits electromagnetic waves and measures the position of the vehicle 4 on the basis of the strength of the electromagnetic waves reflected from the vehicle 4, the time it takes for reflection, and the like. The position information acquirer 34 may acquire the position of the vehicle 4 by receiving information about the position of the vehicle 4 measured by a device outside the power transmission device 3.

In the embodiment described above, the power transmission device 3 includes a light emitting element that emits light information, but a configuration is possible in which the vehicle 4 includes a light emitting element that emits light information. A configuration is possible in which, in step S202, when the controller 46 of the vehicle 4 receives the foreign object information via the communicator 48, the controller 46 lights the light emitting element in the abnormal time color, causes the operator to recognize that the foreign object FB is disposed in the power transmission range of the power transmission coil 321 that is the detection target region, and prompts the operator to stop the vehicle 4.

Moreover, a configuration is possible in which the reference position s is set to a position separated from the one end (the position c) of the power transmission coil 321 by the braking distance of the vehicle 4; the microcomputer 31 determines that the leading edge position (position of Xm−L on the X axis) on the power transmission coil 321 side of the vehicle 4 is farther from the one end (the position c) of the power transmission coil 321 than the reference position s, that is, determines that the vehicle 4 has not reached the reference position s, and carries out the foreign object detection operation; and the microcomputer 31 determines that the leading edge position (position of Xm−L on the X axis) on the power transmission coil 321 side of the vehicle 4 is closer to the one end (the position c) of the power transmission coil 321 than the reference position s, that is, determines that the vehicle 4 has reached the reference position s, and does not emit the foreign object information even if the foreign object FB is present in the power transmission range of the power transmission coil 321 that is the detection target region. Such a configuration makes it possible to more reliably stop the vehicle 4 before the vehicle 4 covers the power transmission coil 321 or the foreign object FB, while suppressing unnecessary and non-urgent notifications and reducing annoyance.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A power transmission device that wirelessly transmits power to a vehicle provided with a power receiving function, the power transmission device comprising:
    a power transmitter that includes a power transmission coil and that transmits power to the vehicle via the power transmission coil;
    a detector that includes a function for detecting a foreign object present in a detection target region;
    a position information acquirer that acquires a position of the vehicle;
    an instruction receiver that receives an instruction about power transmission to the vehicle; and
    an information emitter that
        in a case in which the position of the vehicle acquired by the information acquirer is located in a power transmission range of the power transmission coil and, also, the instruction receiver receives the instruction about power transmission, emits a first type of information that indicates a presence of the foreign object when the detector detects the foreign object, and
        in a case in which the instruction receiver does not receive the instruction about power transmission even though the position of the vehicle acquired by the position information acquirer is located in the power transmission range of the power transmission coil, does not emit the information that indicates the presence of the foreign object.

2. The power transmission device according to claim 1, wherein the detector disables the function for detecting the foreign object in the case in which the instruction receiver does not receive the instruction about power transmission even though the position of the vehicle acquired by the position information acquirer is located in the power transmission range of the power transmission coil.

3. The power transmission device according to claim 1, wherein
    the power transmitter further includes a power transmission circuit that supplies electric power to the power transmission coil, and
    in the case in which the position of the vehicle acquired by the position information acquirer is located in the power transmission range of the power transmission coil and, also, the instruction receiver receives the instruction about power transmission,
    the power transmission circuit
        stops the supply of electric power to the power transmission coil in a period in which the detector detects the foreign object, and
        starts the supply of electric power to the power transmission coil after the detector no longer detects the foreign object.

4. The power transmission device according to claim 1, wherein
    the information emitter
        in a case in which the position of the vehicle acquired by the position information acquirer is separated farther from the power transmission coil than a reference position, emits a second type of information that indicates the presence of the foreign object when the detector detects the foreign object, and
        in a case in which the position of the vehicle acquired by the position information acquirer is closer to the power transmission coil than the reference position, does not emit the information that indicates the presence of the foreign object.

5. The power transmission device according to claim 4, wherein the reference position is set to a position separated from the power transmission coil by a braking distance of the vehicle.

6. The power transmission device according to claim 4, wherein the reference position is set to a position of the vehicle when a portion of the vehicle covers the power transmission coil.

7. The power transmission device according to claim 4, wherein in a case in which the position of the vehicle acquired by the position information acquirer is closer to the power transmission coil than the reference position, the detector disables the function for detecting the foreign object.

8. A wireless power transmission system, comprising:
the power transmission device according to claim 4; and
a vehicle that receives electric power sent from the power transmission coil of the power transmission device, the vehicle including
a driver that generates motive force,
a communicator that receives the second type of information emitted from the information emitter of the power transmission device, and
a controller that controls the driver on the basis of receipt of the second type of information by the communicator.

9. A wireless power transmission system, comprising:
the power transmission device according to claim 1; and
a power receiving device that receives electric power sent from the power transmission coil of the power transmission device.

10. An information communication system, comprising:
the power transmission device according to claim 1; and
a communication device that receives the first type of information emitted from the information emitter of the power transmission device.

\* \* \* \* \*